Figure 1:
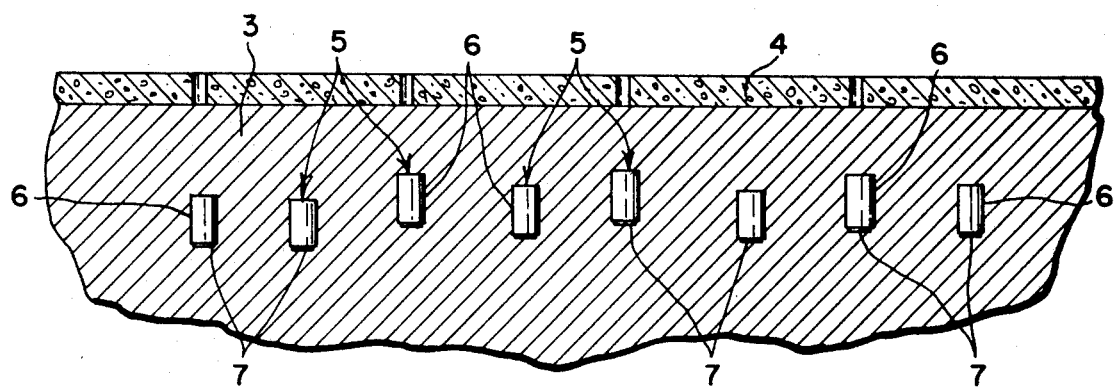

United States Patent [19]

Basile

[11] 4,043,073

[45] * Aug. 23, 1977

[54] METHOD OF TREATING SOIL FOR CONTROLLING TERMITES AND THE LIKE

[76] Inventor: Mario J. Basile, 85-12 Fifth Ave., Brooklyn, N.Y. 11209

[ * ] Notice: The portion of the term of this patent subsequent to Mar. 2, 1993, has been disclaimed.

[21] Appl. No.: 598,655

[22] Filed: July 24, 1975

Related U.S. Application Data

[63] Continuation-in-part of Ser. No. 496,363, Aug. 9, 1974, Pat. No. 3,940,875.

[51] Int. Cl.² .............................................. A01M 1/20
[52] U.S. Cl. ...................................... 43/124; 43/131; 43/132 R
[58] Field of Search ......................... 43/124, 132, 131; 47/48.5

[56] References Cited

U.S. PATENT DOCUMENTS

| | | | |
|---|---|---|---|
| 3,864,867 | 2/1975 | Dry | 43/131 |
| 3,940,875 | 3/1976 | Basile | 43/124 |

*Primary Examiner*—Warner H. Camp
*Attorney, Agent, or Firm*—Howard C. Miskin

[57] ABSTRACT

A soil or other ground cover is treated for termite or other pest control by dispersing in the soil or on the ground, a toxic insecticide in an active available state and a toxic insecticide in an initially unavailable state and timed to be released before complete dissipation of the immediately available insecticide. The initially unavailable insecticide is enveloped in a container made of a material either in whole, in part attractive to and edible by the pest to release the insecticide when the container or plug is eaten by the pest. Combined with the insecticide is any odoriferous material which will signal the presence of termites by its distinctive odor. A soil coloring agent can be used also or in addition to provide a visual signal. The odor producing agent can be used alone.

17 Claims, 2 Drawing Figures

U.S. Patent    Aug 23, 1977    4,043,073

METHOD OF TREATING SOIL FOR CONTROLLING TERMITES AND THE LIKE

This is a continuation-in-part application of my copending application Ser. No. 496,363 filed Aug. 9, 1974 and now U.S. Pat. No. 3,940,875.

The present invention relates generally to improvements in termite and pest control and it relates particularly to an improved method for treating soil, ground or storage facilities to control subterranean termites or like pest for extended periods of time, and to signal their presence.

The damage to wood containing buildings by subterranean termites, which are prevalent in both northern and southern areas, is very extensive, and various procedures are widely employed to minimize and prevent such damage. A practice which is widely and generally employed in this connection involves the impregnation of the soil with a persistent termite toxic insecticide before the erection of the wood containing structure thereon. However, the insecticides which are employed are not indefinitely effective and after a few years, the treated soil is no longer toxic to termites and termite colonies may then be established in the soil with consequent damage to the overlying structure. Since termites are a subterranean creature, their presence is not normally known until after some damage has occurred or by swarming at certain times. It thus becomes necessary upon depletion of the insecticide to replenish the insecticide in the soil, a procedure which in many cases is highly expensive and inconvenient particularly where the building includes a concrete floor slab resting directly on the ground, since this necessitates the drilling of numerous holes in the ground slab to permit the treatment of the underlying soil as well as the digging of trenches about the base of the structure. Thus the re-treatment of the soil underlying a building for termite control is an expensive, inconvenient process and any practice which reduces the frequency of the necessity of such procedures is highly desirable, similarly, preventive treatment for other pests such as roaches, ants, mice, rats, or the like, are likewise a problem.

It is therefore a principal object of the present invention to provide an improved termite or pest control process.

A further object of the present invention is to provide an improved manner of detecting the presence of pests.

Another object of the present invention is to provide an improved process for the treatment of soil for the control of subterranean termites and provide an easy manner of detecting the presence of termites.

Still another object of the present invention is to provide an improved process for increasing the duration of the effectiveness of the pest control treatment of soil and enhancing a pest barrier.

A still further object of the present invention is to provide an improved process for treating soil prior or subsequent to the erection of a structure thereon and attendant to the conventional termite control treatment thereof for extending the time of and reinforcing the termite inhibition properties of the soil.

A yet further object is to provide a warning of the presence of specified pests so as to allow a localized treatment for that pest.

Still a further object of the present invention is to provide a process of the above nature characterized by its simplicity, reliability and high versatility and adaptability.

Figure 2:
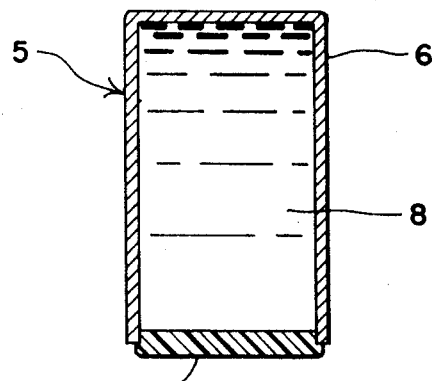

The above and other objects of the present invention will become apparent from a reading of the following description taken in conjunction with the accompanying drawing which illustrates a preferred embodiment thereof, wherein:

FIG. 1 is a vertical sectional view of a slab on ground construction treated in accordance with the present method and FIG. 2 is a longitudinal medial longitudinal sectional view of a termicide loaded receptable embodying the present invention;

In a sense, the present invention contemplates the provision of a method for treating a soil to control subterranean termites comprising dispersing in the soil a termite toxic insecticide in an initially unavailable state combined with an odor producing ingredient or a dye and releasable into the soil after a predetermined time interval or after reinfestation. The initially unavailable insecticide is advantageously released when the initially available insecticide has sufficiently dissipated, so that the support of termite colonies in the soil is no longer prevented and the subterranean termite barrier is continued or when termites appear before the release of the unavailable insecticide by corrosion. Also, containers made of a termite attractive, edible material, in whole or in part, containing only an odor producing material, can be used which will provide an early indication of when termites are present since the eating of the container, or a part will release the volatile material, producing the distinctive odor.

The initially unavailable insecticide and odor producing or visual material is advantageously distributed in the soil in closed receptacles such as envelopes or containers which prevent the escape of the insecticide and preserve the full activity thereof. The receptacles are formed of a metal which sufficiently corrodes in the soil in the desired time, for example, in about 5 years, and may for example, be formed of thin steel plate. If desired, in order to accelerate the corrosion of the metal another metal may be associated with the containers to promote electrolytic action or to delay the corrosion, the metal may be plated with a more corrosion resistant metal or otherwise selectively coated. Also, the receptacle may be formed of a synthetic organic polymeric resin, for example a thin polyethylene, a cellulosic material, such as cellulose acetate, a polystyrene or a polyvinyl chloride, polyvinyl acetate, phenol formaldehyde, neoprene and styrene dibromide, or synthetic rubbers, which weathers and ruptures in the desired time interval as explained above or is attractive to the termites, which consume the plastic and release the insecticide and the odor producing material. Instead of relying on the action of the soil to corrode or degrade the receptacle, a suitable agent may be contained in the receptacle having such activity and which does not adversely affect the insecticide. Normally the corrosion rate of the metal receptacle depends on the metal used, its thickness, soil composition and any additive used.

Among the termite toxic insecticides which may be employed both as the initially available and unavailable insecticides are chlordane, dieldrin, benzene hexachloride, aldrin, heptaclor and the like. In the application of the immediately available insecticides they are advantageously applied as water emulsions although they may be highly concentrated oil solutions or water emulsions, and in cases where the insecticide has a high vapor pressure, as in the case of dieldrin, it may be containerized in the solid state. Similarly, even a powder form can be used and depend on the moisture of the soil to permeate. Furthermore the containers are advantageously of small size and may be capsules or microcapsules of suitably corrodible, degradable or termite edible material or may be deferred by a suitable coating on the insecticide substrate. In a form for use around the foundation; cylinders or tubes, such as the size of bullets or shotgun shells, can be used, deformed to close off certain lengths. Another form of container to be used as illustrated in FIG. 2 can combine a metal container 6, closed at one end, with a plastic plug 7 at the other end preventing the insecticide and odor producing and visual agent 8 which is in fluid form as explained herein, from flowing from the metal container. The plug is made from a plastic that termites find attractive and consume. If the container is placed in the ground so that the plug is the lowest point, when the termites consume the plug, the insecticide and added agents flow from the container and the insecticide treats the soil and the odor producing material emits an odor that alerts the homeowner of the presence of termites. If a dye is used, it should permeate the ground and provide a visula indication of the presence of termites. The homeowner can then take additional protective steps as desired. Some plastics that termites find attractive and consume are cellulose acetate, polyvinyl chloride, polyvinyl acetate, polystyrene, phenol formaldehyde, neoprene, styrene dibromide, and synthetic rubbers. Some examples or odor producing ingredients are oil of wintergreen, peppermint, and spearmint, ammonia, menthol, thymol, camphor, "essential oils", and artificial scents such as animal, astringent or medicinal odors, which are well known in the cosmetic, perfumery and food fields. Normally, flower, tree and grass scents should be avoided to avoid confusion with any plants or flowers in the neighborhood, but such scents could be used if desired. Some coloring materials which can be used are red oxide or black oxide.

The insecticides may be applied before the erection of the overlying structure or, whenever indicated, to the underlying soil of an existing structure. Thus, in treating the soil before the erection of the building, the soil is impregnated with a solution or emulsion of the termite toxic insecticide and the units of the delayed release termite toxic insecticides are uniformly distributed throughout the soil nd the overlying structure then erected. Where the underlying soil of an existing structure is treated, a similar procedure is followed, trenches being dug about the structure and holes being drilled in the concrete ground slab where present, to facilitate and permit the dispersion and distribution of the immediately available and the delayed release insecticides.

Also, while the odor producing materials or dyes have been described in use with the delayed release, insecticide materials, they can be used alone or in combination in a container made of a termite attractive and edible material. Upon the termites eating the container or plug, the volatile odor signalling material or dye will be released, thereby providing an olefactory or visual signal on the agent used, that termites are present in the soil.

By way of example as shown in FIG. 1 in the treatment of the soil 3 underlying on a slab-on-ground house, holds of about ¼ inch to 1 inch in diameter are made in the slab 4 about 1 foot apart and 6 inches from the wall. Thereafter, an aqueous emulsion of dieldrin of about 0.5 percent concentration is pumped into the underlying soil through the holes at the rate of at least two and preferably in excess of 3 gallons of the dieldrin emulsion for each 5 lineal feet of wall. Cans 5 having closure plugs 7 formed of a material attractive to and edible by termites of the nature described above and containing a high concentration emulsion of the dieldrin, for example exceeding 18%strength or undiluted dieldrin and 20% of oil of peppermint are inserted through the holes into the underlying soil and the holes are then sealed. The metal cans are formed of a predetermined thickness of can type sheet steel depending on the type of soil in which it is to be used or coated depending on the soil characteristics. Along the outside of the building, trench is dug about 6 to 8 inches wide and about a foot deep and the 0.5% strength emulsion is applied to the trench at the same rate as applied through the holes preferably by first applying part of the dieldrin emulsion to the trench, distributing the containers of dieldrin and oil of peppermint along the trench, covering the base of the trench with about 4 to 6 inches of soil, applying the remainder of the 0.5% dieldrin emulsion and enclosed dieldrin and filling the trench with additional soil and tamping the soil. Advantageously the amount of dieldrin applied as aqueous emulsion and that applied in cans are approximately equal although the proportions may be varied depending on ambient conditions.

Another example is a container made of a termite edible material containing 40% of a dieldrin emulsion, 40% of oil of spearmint, and 20% of red oxide.

The above procedure may be varied in accordance with the type of structure, that is in connection with crawl space houses, basement houses, etc. Furthermore, other termite toxic insecticides and odor producing agents such as those earlier identified, may be substituted for the dieldrin and oil of peppermint respectively, or a dye added. The containers are of a size permitting their insertion into the holes and their suitable distribution in the trenches and, as above set forth, may be formed of a synthetic organic polymeric resin such as soil weatherable polyethylene or the like or a termite edible cellulosic material that will disintegrate within the selected time period or be eaten by the termites, if they return sooner than expected or the corrosion rate of the container is slower than expected. The eaten container releases the insecticide, odor when needed. A metal container with a plastic plug, as described earlier, can likewise be used. Similarly, the container could only contain a volatile, aromatic material that rises through the soil to produce a distinctive odor above ground. Similarly, only a coloring agent can be used which permeates the ground and provides a visual signal on the ground.

It has been found that once the type of material of the container is decided upon, the wall thickness of the container can be selected to release the insecticide contained therein within the time period selected within a range of plus or minus approximately a year which is not critical, depending on the characteristics of the soil and the corrosion rate of the metal. Similarly, the thickness of a plastic plug can determine the time it is destroyed by the termites and release the insecticide.

While the above description was intended primarily for control and alarm for termite and termite type insects, the article and process could be utilized for other types of pests, such as rodents, ants, roaches and the like and the container can be made of a material that is appealing to the particular pest involved. Hence, a peanut type base can be utilized in the container wall which would be attractive to beetles and rodents. Upon the destruction or penetration of the wall of the container by that pest a signal will be released such as visual or odorforous. Hence, to warn of the presence of predetermined insects or rodents requires the proper combination of plastic or container forming material, attractant and the odorizer and/or dye. Also the insect hormones or sex hormones or chemical analogues can be added to the attractants as part of the material of the container or plastic wall to enhance the attraction.

If the early warning articles are utilized above the ground, such as with grain storage facilities, like corn, wheat, or the like, there is a possibility that these articles may be eaten by friendly animals or even humans. Hence, no insecticide need be used within the container and merely a safe or harmless odor forming or dye can be utilized so that if even this material is engested, no harm will be done to the animal or human that inadvertantly eats the article. This by eliminating any insecticide or hazardous substance, these articles provide a clear warning when a particular pest is infesting a particular area so as to allow specific elimination steps to be taken only when the infestation occurs. An odor or dye would be recognizable long prior to any significant insect or vermen or rodent destruction is accomplished. Further it is obvious that the indiscriminate use of insecticides is avoided and a more potent even though more limited use of insecticides can be directed to the specific insect or rodent involved.

It has been found that by adding a specific ingredient to the plastic or container wall will attract a specific insect or animal. For example it has been found that by adding pheromones or enzymes to the plasticizer will attract roaches. Also, if a proteinaceous material were added to the plasticizing material, such as used in a polyvinyl chloride, the product will be attractive to ants, roaches and sawflies. A peanut material will attract rodents, such as mice, rats and squirrels. Also, since the insecticide or poison is sealed, it retains its life and avoids environmental contamination until specifically needed. It is thus seen from the above description that the homeowner or party is alerted to the release of initially unavailable insecticide or pest destroyer by a distinctive odor and/or a visual indication. The release can be caused by the eating of the cap or body of the container by termites, other insect, rodent, or pest when the container is made from a material edible or attractive to the specific pest to which it is directed or after a predetermined period of time, if a corrodible metal or degradable plastic is used. In either case, the homeowner replenishes the insecticide containers or pest destroyer to maintain the pest barrier. If the containers are made in whole or in part of a pest attractive or edible material and only contain an odor producing and/or visual dye, the owner is alerted to the presence of a pest, such as termites or rodents and will proceed to take preventive action. While 20% of the odor forming material was used in the examples above, from about 10 to about 50% can be used. Also, from about 10 to about 50% of a dye can be used with the insecticide.

The containers of the present invention could contain a slow acting poison or insecticide such as the material sold by Allied Chemical under the trademark MIREX. The pest will bring some of this material back to the nest to kill off those pests in the nest. The container material could be bait to maintain the visual or aroma alert material. The pest in puncturing the container would retain this poison until it returns to the nest as well as providing a signal of its presence.

While there have been described preferred embodiments of the present invention, it is apparent that numerous alterations, omissions, and additions may be made without departing from the spirit thereof. For example, the soil may be treated in the above manner before the start of the building erection and the release of the insecticide may be delayed in other manners such as by coating encapsulation provided that the envelopes become ruptured or permeable to the insecticide at the desired time.

What is claimed is:

1. The method of providing a signal that insect or rodent pests are present in a localized area comprising dispersing contiguous to said area, a volatile odor forming material enveloped in an imperforate enclosure substantially impermeable to said material, making a portion of said enclosure of a material attractive to and edible by said pest, placing that portion in the area so that any pest in the area adjacent said enclosure would consume said portion and free said odor forming material to produce an odor detectable in said area.

2. The method of claim 1 further including adding a pest toxic material to said enveloped material and placing said attractive material at the lower point of said enclosure in the area.

3. The method of claim 1 wherein said attractive material is a plastic.

4. The method of claim 1 wherein said enclosure is a container closed at one end and open at the other end, said portion attractive to and edible by said pest comprises a plug made of a plastic material and closing the open end of said container.

5. The method of claim 1 wherein said pest is a rodent and said attractive material is peanut butter.

6. The method of claim 1 wherein said pest is ants or termites and the attractive material is proteinaceous material.

7. An article for producing a signal in response to the presence of an insect or rodent pest in a defined area comprising a volatile material producing a distinctive odor at least within the area enveloped in an imperforate container having walls, said container walls including a wall portion formed from a material which is attractive to and consumed by said pests for releasing said material for detection at least within said area.

8. The article of claim 7 wherein said material that is attractive to said pests is made up of one of the following plastic materials; polyvinyl chloride, polystyrene, polyethelyne.

9. The article of claim 7 wherein said pest is a rodent and the attractive material includes a peanut butter aroma.

10. The article of claim 7 further including a pest toxic material enveloped within said container.

11. The article of claim 7 wherein said odor forming material includes one of the following materials: oil of peppermint, oil of spearmint, ammonia, "essential oils", menthol, camphor, thymol, and materials which have characteristic odors of selected animals, medicines, flowers, trees or plants.

12. The article of claim 7, wherein said container has one opening at one end, said wall portion formed from a plastic material that is attractive and edible by said pests being a plug covering said opening.

13. The method of providing a signal that pests are present comprising dispersing in a predetermined area a stain producing material enveloped in an imperforate enclosure substantially impermeable to said material, making a portion of said enclosure of a material attractive to and edible by said pests, placing that portion in the area so that any pests in the area adjacent said enclosure would consume said portion and free said stain producing material to produce a stain.

14. The method of claim 13 wherein said pests are rodents and said attractive material has the aroma of peanut butter.

15. The method of claim 13 further including adding a pest toxic material to said enveloped material and placing said attractive material at the lowest point of said enclosure in the soil.

16. An article for producing a signal in response to the presence of rodent or insect pests within a predetermined area comprising a staining material enveloped in an imperforate container having walls, said container walls including a wall portion formed from a material which is attractive to and consumed by said pests for releasing said staining material for detection within the said area.

17. The article of claim 16 further including a pest toxic material enveloped within said container.

* * * * *